US010733961B2

(12) United States Patent
Cho (10) Patent No.: US 10,733,961 B2
(45) Date of Patent: Aug. 4, 2020

(54) DISPLAY APPARATUS AND CONTROL METHOD THEREOF

(71) Applicant: SAMSUNG ELECTRONICS CO., LTD., Suwon-si (KR)

(72) Inventor: Dae-woong Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 37 days.

(21) Appl. No.: 15/726,734

(22) Filed: Oct. 6, 2017

(65) Prior Publication Data

US 2018/0114508 A1    Apr. 26, 2018

(30) Foreign Application Priority Data

Oct. 24, 2016   (KR) .................. 10-2016-0138621

(51) Int. Cl.
*G09G 5/30* (2006.01)
*G09G 5/14* (2006.01)
*G09G 5/00* (2006.01)
*G09G 5/395* (2006.01)
*G06F 3/14* (2006.01)

(52) U.S. Cl.
CPC ............ *G09G 5/14* (2013.01); *G06F 3/1446* (2013.01); *G09G 5/003* (2013.01); *G09G 5/006* (2013.01); *G09G 5/395* (2013.01); G09G 2300/026 (2013.01); G09G 2310/08 (2013.01); G09G 2360/04 (2013.01); G09G 2370/08 (2013.01); G09G 2370/10 (2013.01); G09G 2370/12 (2013.01); G09G 2370/20 (2013.01); G09G 2370/22 (2013.01)

(58) Field of Classification Search
CPC .......... G09G 3/3611; G09G 5/18; G09G 5/14; G09G 5/003; G09G 5/395; G09G 2300/026; G09G 2370/08; G09G 2370/10; G09G 2370/12; G09G 2370/22; G06F 3/1446
USPC .................... 345/473, 474, 204, 1.1, 1.3, 76
See application file for complete search history.

(56) References Cited

U.S. PATENT DOCUMENTS

| 2009/0309855 | A1  | 12/2009 | Wang et al. |
| 2010/0194714 | A1  | 8/2010  | Hsieh |
| 2013/0063443 | A1* | 3/2013  | Garside ................. G06T 15/005 345/473 |
| 2015/0371607 | A1* | 12/2015 | Holland .................... G06T 1/20 345/213 |
| 2015/0379772 | A1* | 12/2015 | Hoffman ............... G06T 19/006 345/633 |
| 2017/0132987 | A1* | 5/2017  | Kato ...................... G09G 5/006 |

* cited by examiner

*Primary Examiner* — Jennifer T Nguyen
(74) *Attorney, Agent, or Firm* — Sughrue Mion, PLLC (57) ABSTRACT

A display apparatus and a control method thereof are disclosed. The display apparatus includes a display unit comprising a plurality of displays; an image signal receiver; and a controller configured to: in response to an image source being changed from a first image source to a second image source while a first image of the first image source is being displayed on the display unit, determine whether the displays are ready to process an image signal of the second image source, and display one of the first image and a second image corresponding to the image signal of the second image source on the display unit based on a result of the determining.

18 Claims, 8 Drawing Sheets

DISPLAY APPARATUS AND CONTROL METHOD THEREOF

CROSS-REFERENCE TO RELATED APPLICATION

This application claims priority from Korean Patent Application No. 10-2016-0138621, filed on Oct. 24, 2016 in the Korean Intellectual Property Office, the disclosure of which is incorporated herein by reference in its entirety.

BACKGROUND

Field

Apparatuses and methods consistent with exemplary embodiments relate to a display apparatus and a control method thereof, and more particularly to a display apparatus for displaying an image in accordance with an input of new image source and a control method thereof.

Description of Related Art

There are many types of image transmission interfaces, such as a D-subminiature (D-SUB), a digital visual interface (DVI), a high definition multimedia interface (HDMI), a display port (DP), etc., which transmit an image signal to a display apparatus from an external image source. The display apparatus is therefore often provided with various kinds of receiving ports corresponding to the image transmission interfaces, respectively, thereby enabling a single display apparatus to receive the image signal via different types of image transmission interfaces.

However, the image transmission interfaces have different regulations and standards and thereby signals received via the image transmission interfaces come to have different forms and structures, contents and the like. Accordingly, even though one display apparatus can support many type of image transmission interfaces, if an input source is changed from a first type of interface to a second type of interface while the displayed image is being received via the first interface (see 101 in FIG. 1), an initialization process for the second type of interface is required to be performed for a given time.

Figure 1:
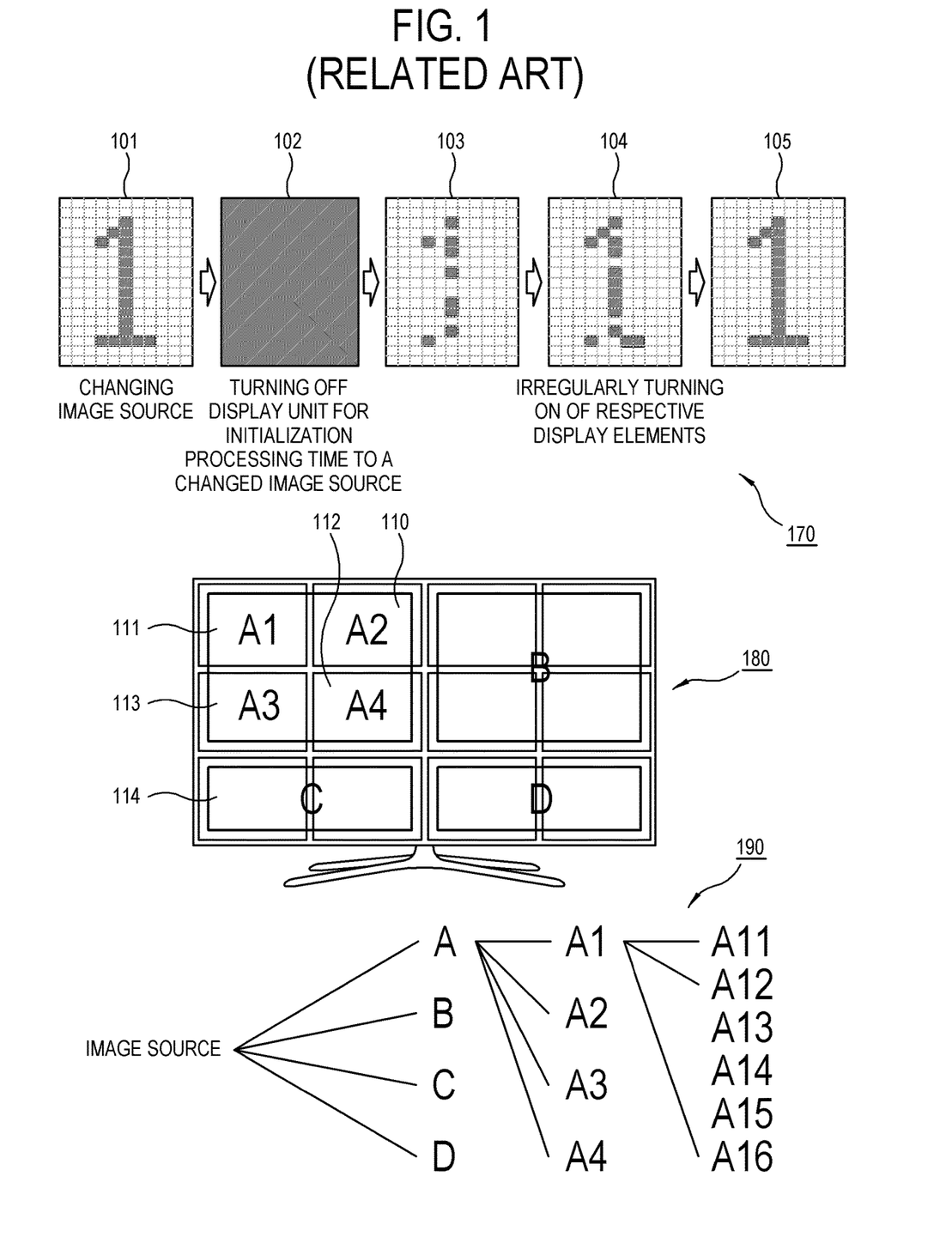
FIG. 1 is a view illustrating a problem occurred when an image source is changed to another.

Accordingly, display elements of the display apparatus are turned off until an image signal according to the newly changed image source is processed and received (see 102 in FIG. 1). The display elements of the display apparatus are turned on again if the image signal according to the newly changed image source, i.e., the second type of interface, is processed and received (see 103-105 in FIG. 1).

However, even if the display elements or devices are composed of the same hardware, they may have differences in time (hereinafter, referred to as "reproducing time differences") required for the new image signal to be displayed. There are many reasons for the reproducing time differences, such as transmission delays occurred while transferring the image signal to the display elements, differences in processing speed occurred between the display elements while reproducing the image, delays on the hardware, etc.

As the display size increases, the number of the display elements increases and the problem caused by the reproducing time difference between the displays becomes serious because the reproducing time differences between the displays get larger. The reason is that if the reproducing time differences become large enough to be perceptible by user, it appears to the user as a phenomenon where the screen gets spotted (see 103-104 in FIG. 1). View 170 of FIG. 1 illustrates the phenomenon where the screen gets spotted as above when one image source is changed to another.

The problem caused by the reproducing time differences becomes more serious in a multi display apparatus, a tile display apparatus, or the like in which a plurality of display modules are connected to be used as one screen. The reason is that since in the multi display apparatus, it is technically difficult to simultaneously distribute the image source to the plurality of display modules, and most multi display apparatuses distribute the image source in hierarchical structure to the display modules, thereby causing the display elements of the full screen to have larger reproducing time differences therebetween. For example, as illustrated in view 180, an entire multi display is divided into A, B, C, and D areas, so that an image source is distributed to the A, B, C, and D areas. The A area is again divided into A1, A2, A3, and A4 areas, so that the image source is distributed to the A1, A2, A3, and A4 areas. In the A1 area, the image source is distributed to display modules A11 to A16. In this case, since the image source is distributed three times until it arrives at the final display modules A11 to A16, reproducing time differences between the display modules and reproducing time differences between the display elements in each display module become larger, as compared with those in a display apparatus with a signal display module.

SUMMARY

Exemplary embodiments may address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a display apparatus including: a display unit including a plurality of displays; an image signal receiver configured to select one of a plurality of image sources and receive an image signal from the selected image source; and a controller configured to: in response to detecting that an image source is changed from a first image source to a second image source while a first image of the first image source is being displayed on the display unit, determine whether the displays are ready to process an image signal of the second image source, and display one of the first image and a second image corresponding to the image signal of the second image source on the display unit based on a result of the determining.

The controller may be further configured to determine whether the displays are ready to process the image signal of the second image source based on signals inputted to or outputted from the displays.

Each of the plurality of displays may include a plurality of display elements, and the controller may be further configured to determine whether the plurality of display elements are ready to process the image signal of the second image source.

The controller may be further configured to determine whether the displays are ready to process the image signal of the second image source using a plurality of logic AND gates connected to the displays.

The display apparatus may further include a storage, wherein the controller may be further configured to store in the storage the first image, and display the stored first image until the displays are ready to process the image signal of the second image source.

Each of the plurality of displays may be a display module.

The controller may be further configured to determine whether the plurality of display elements are ready to process the image signal of the second image source based on characteristics of signals inputted to or outputted from the displays.

The controller may be further configured to determine whether the plurality of display elements are ready to process the image signal of the second image source based on whether the signals have a level equal to or greater than a predetermined level.

The controller may be further configured to determine whether the plurality of display elements are ready to process the image signal of the second image source based on packet information of signals inputted to or outputted from the displays.

The display apparatus may further include: a display driver configured to drive the displays; and a timing controller configured to provide a control signal for the display driver, wherein the controller is further configured to determine whether the plurality of display elements are ready to process the image signal of the second image source based on signals inputted to one of the display driver, the timing controller and the displays.

According to an aspect of an exemplary embodiment, there is provided a method for controlling a display apparatus including a plurality of displays, the method including: displaying a first image of a first image source; in response to detecting that an image source is changed to a second image source while the first image is being displayed, determining whether the displays are ready to process an image signal of the second image source; and display one of the first image and a second image corresponding to the image signal of the second image source on the display unit based on a result of the determining.

The determining may include determining whether the displays are ready to process the image signal of the second image source based on signals inputted to or outputted from the displays.

Each of the plurality of displays may include a plurality of display elements, and the determining may include determining whether the plurality of display elements are ready to process the image signal of the second image source.

The determining may include determining whether the displays are ready to process the image signal of the second image source using a plurality of logic AND gates connected to the displays.

The method may further include: storing the displayed first image; and displaying the stored first image until the displays are ready to process the image signal of the second image source.

Each of the plurality of displays may be a display module.

The determining may include determining whether the plurality of display elements are ready to process the image signal of the second image source based on characteristics of signals inputted to or outputted from the displays.

The determining may include determining whether the plurality of display elements are ready to process the image signal of the second image source based on whether the signals corresponding to the respective displays have a level equal to or greater than a predetermined level.

The determining may include determining whether the plurality of display elements are ready to process the image signal of the second image source based on packet information of signals inputted to or outputted from the displays.

The display apparatus may further include a display driver configured to drive the displays and a timing controller configured to provide a control signal for the display driver, and the determining may include determining whether the plurality of display elements are ready to process the image signal of the second image source based on signals inputted to one of the display driver, the timing controller and the displays.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, with reference to accompanying drawings, exemplary embodiments, which can concretely realize the above and other aspects, features, and advantages of the present disclosure, will be described in detail. However, the technical sprit and core constructions and effects of the present disclosure are not limited to those of the embodiments provided herein. In the following description and accompanying drawings, descriptions of well-known technologies and constructions, which can cloud the gist of the present disclosure, will be omitted for clarity and conciseness.

In the following description of various exemplary embodiments, if terminologies, each of which is in the singular, are used, those terminologies are used to include the plural unless the context expressly otherwise requires. Further, in the following description, if terms, such as 'include', 'have' and the like, are used, those terms are used (unless expressly specified otherwise) for the purpose of indicating that features, numbers, steps, operations, elements or combinations thereof described in the description exist, and not for the purpose of excluding the possibility that more than one other feature, number, step, operation, element or a combination thereof exists or is added. Also, in the exemplary embodiments described herein, "module" or "unit" may carry out at least one function or operation, may be realized as a software, a hardware or a combination thereof, and may be realized as at least one processor, which is integrated into at least one module.

Figure 2:
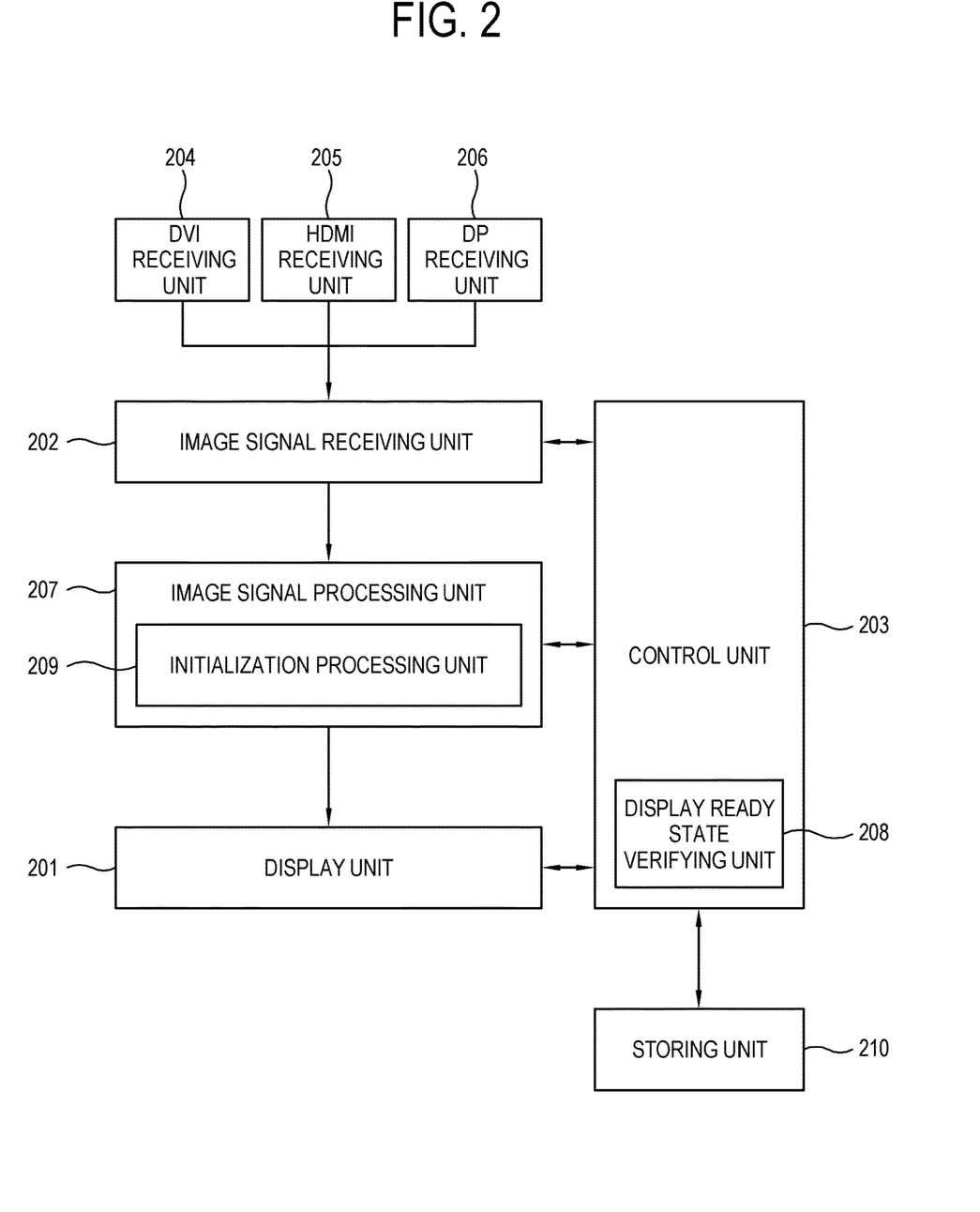
FIG. 2 is a block diagram illustrating constructions of a display apparatus according to an exemplary embodiment.

FIG. 2 is a block diagram illustrating a display apparatus according to an exemplary embodiment. The display apparatus according to an exemplary embodiment may include a display unit 201, an image signal receiving unit 202, and a control unit 203.

The display unit 201 may include a plurality of displays. Hereinafter, the term "displays" means respective detail units of the display unit 201, each of which acts to receive a processed image signal and to give body to the processed image signal as light of colors that can be viewed by user. For example, the displays may be display elements, which constitute the display unit 201. In this case, types of the display elements are not specifically limited. In other words, all sorts of display elements, such as a liquid crystal, a plasma, a light-emitting diode, an organic light emitting diode, a surface-conduction electron-emitter, a carbon nanotube, a nano-crystal, etc., may correspond to each of the displays according to an exemplary embodiment.

Alternatively, a display module itself may correspond to each of the displays according to an exemplary embodiment. In this case, since the plurality of displays becomes a plurality of display modules, the present disclosure in turn may be applied to a multiscreen display apparatus or tile display apparatus (hereinafter, referred to as a "multi display apparatus"), which includes the plurality of display modules. However, like the single display apparatus, the multi display apparatus may be also configured so that respective detail display elements constituting each display module, not respective display modules, correspond to the displays according to an exemplary embodiment.

The present disclosure may be particularly useful to a display apparatus having a large screen. Accordingly, the display apparatus according to an exemplary embodiment may be materialized by a large-sized television (TV), a digital advertising board, a large format display (LFD), a signage, etc. However, the present disclosure is not limited to the display apparatus having the large screen. The display apparatus according to an exemplary embodiment may be also achieved by a smart phone, a tablet computer, a mobile phone, a personal computer, a multimedia player, an electronic frame, a head-mount display (HMD), etc.

The image signal receiver 202 may receive an image signal from an external image source. The image signal receiver 202 may include image transmission ports according to types of image transmission interfaces. As examples of such image transmission ports, there are a digital visual interface (DVI) receiving unit 204, a high definition multimedia interface (HDMI) receiving unit 205, a display port (DP) receiving unit 206, etc. The image signal receiver 202 may select one of the image transmission ports to receive an image signal from the selected image transmission port.

As illustrated in FIG. 2, the image transmission ports may include a plurality of ports 204, 205 and 206, but the present disclosure may be also applied to a display apparatus with one image transmission port. The reason is that while an image is displayed, an initialization process should be often performed even in the display apparatus with which one image transmission port is provided. Detailed explanations on this will be described later.

If a new image signal of a new image source is inputted via the image signal receiving unit 202, the control unit 203 verifies display ready states of the respective displays for an image signal of the new image source and then controls the display unit 201 to display an image of the new image source. For example, if the HDMI receiving unit 205 is selected while an image from the DVI receiving unit 204 is being received and displayed on the display unit 201, the control unit 203 verifies display ready states of the respective displays for an image signal inputted via the HDMI receiving unit 205. Then, the control unit 203 controls the display unit 201 to change the image inputted via the DVI receiving unit 204 and currently displayed on the display unit 201 to the image of the image source inputted via the HDMI receiving unit 205, thereby displaying the changed image on the display unit 201.

The display apparatus may determine whether the image of the new image source should be displayed, based on a corresponding command received from the user or on its own. In the latter case, for example, if a new image signal is inputted via the DP receiving unit 206 while an image signal is being received via the HDMI receiving unit 205 and processed and displayed on the display unit 201, the display apparatus may detect the input of the new image signal automatically and carry out a process of displaying an image based on the new image signal. As another example, if the display apparatus is suddenly powered off while receiving an image signal via one receiving unit, for example, the DVI receiving unit 204, and processing the received image signal to display an image corresponding thereto, the display apparatus should carry out the initialization process even if the image transmission port to which the image signal is inputted has not been changed, in other to newly receive the image signal via the DVI receiving unit 204 and process the received image signal to display an image corresponding thereto. The display apparatus may detect such a situation automatically and perform the process for displaying the image corresponding to the new image signal. As above, while the image is displayed, the initialization processing process may have to be often performed even in the display apparatus having only one image transmission port. Therefore, the present disclosure may be also applied to the display apparatus having only one type of image transmission port.

To verify the display ready states of the respective displays for the image signal of the new image source, the control unit 203 may be provided with a separate display ready state verifying unit 208

The control unit 203 may operate all the elements of the display apparatus and all sorts of process for inputted images including signal processing or the like. A portion for performing such control may be provided in the control unit 203 or provided separately from the control unit 203. The control unit 203 may include programs for implementing the control and the processing operations, a non-volatile memory in which the programs are installed, a volatile memory in which the installed programs is at least partially loaded, and at least one microprocessor or central processing unit (CPU) for executing the loaded programs. The programs may include program(s) achieved in the form of at least one among a basic input/output system (BIOS), a device driver, an operating system (OS), a firmware, a platform, and an application program. According to an exemplary embodiment, the application program may be previously installed or stored in the display apparatus when the display apparatus is manufactured, or installed later in the display apparatus based on data of an application program received from the outside when it is needed. The data of the application program may be for example downloaded from an application market and the like external server to the display apparatus.

The display apparatus according to an exemplary embodiment may further include an image signal processing unit 207. The image signal processing unit 207 processes an image signal according to an image source, so that the display unit 201 can display an image based on the processed image signal. To implement a proper initialization process according to an image transmission interface corresponding to the image source, the image signal processing unit 207 may include an initialization processing unit 209. The initialization processing unit 209 may be implemented by at least one hardware module or at least one software module, or a combination thereof.

The display apparatus according to an exemplary embodiment may further include a storing unit 210. The control unit 203 may store an image, which is currently displayed on the display unit 201, and control the display apparatus to display the stored image on the display unit 201 before an image of the new image source replaces the displayed image, so that it is displayed on the display unit 201.

Below, operations of the display apparatus according to an exemplary embodiment will be described with reference to FIG. 3.

Figure 3:
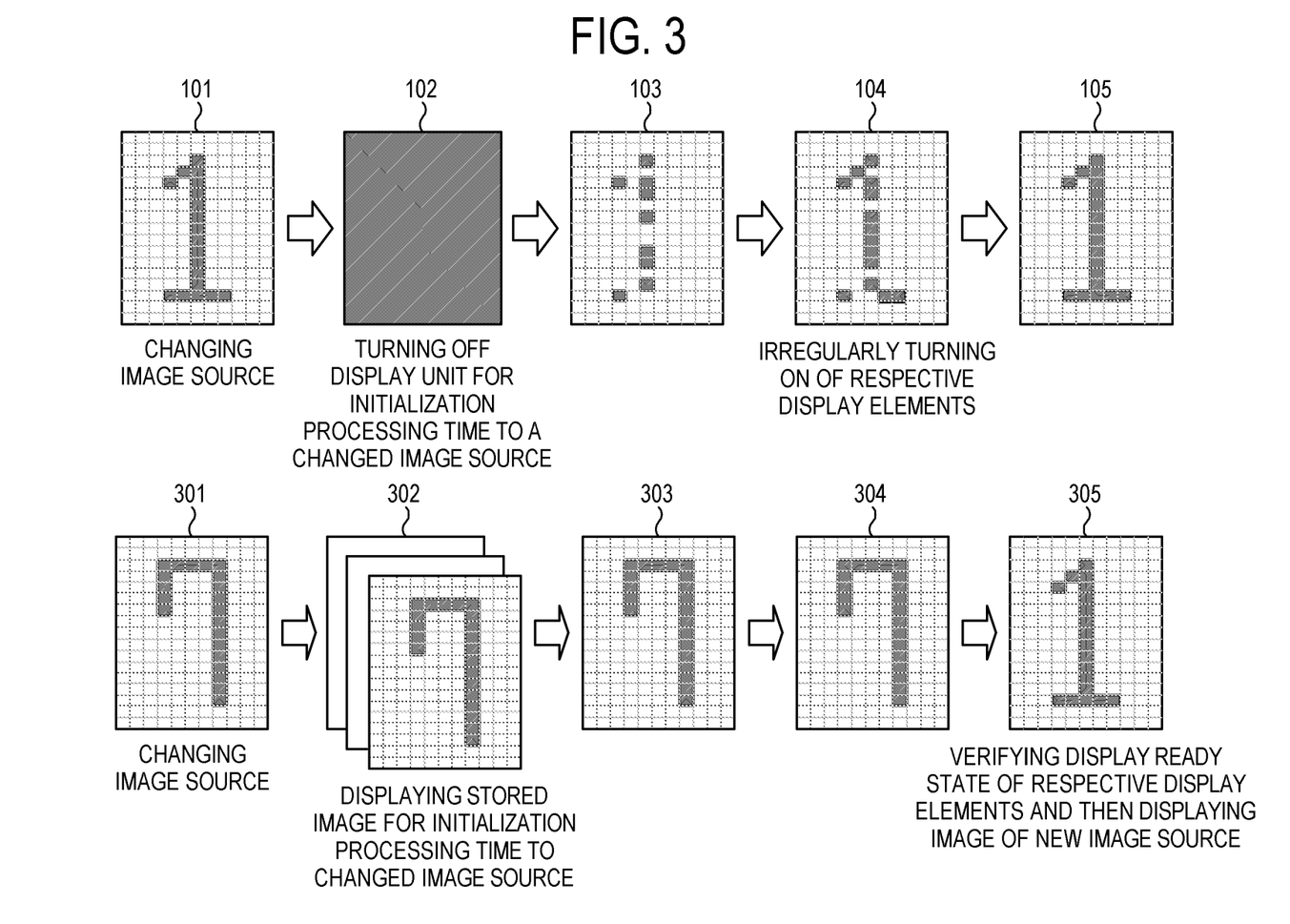
FIG. 3 is a view illustrating operations of a display apparatus according to an exemplary embodiment.

FIG. 3 is a view, which illustrates operations of the display apparatus according to an exemplary embodiment. It is assumed that the display apparatus is a light emitting diode (LED) display, and a plurality of displays constituting the display apparatus is a plurality of elements, i.e., LEDs of the LED display. If an image source is changed to another (301) while an image according to the current image source is being displayed, the display apparatus carries out an initialization process and an image signal processing according to an image transmission interface corresponding to the newly changed image source. The control unit 203 of the display apparatus verifies whether each display is in a display ready state for a corresponding image signal subject to the initialization process and the image signal processing. If it is determined that every display is in the display ready state, the control unit 203 displays an image of the newly changed image source on the display unit 201. Accordingly, the phenomenon that the screen of the display apparatus is turned on or displayed like getting spotted when an image source is changed may be prevented.

From the time when one image source is changed to another (301) until when the image of the newly changed image source is displayed (305), the display apparatus may display a black screen so that nothing is displayed on the display unit 201. However, in order to make the change more natural or smooth, the display apparatus may store the image currently displayed on the display unit 201 and display the stored image until the image of the new image source replaces it (302-304). Thereby, when one image source is changed to another, the display apparatus may change the screen naturally, without the need to turn off and then turn on the screen (102-105), as in the related art display apparatus.

Below, a process of verifying the display ready states of the respective displays for the image signal of the new image source will be explained with reference to FIGS. 4 to 6. These explanations assume that the control unit 203 includes the display ready state verifying unit 208 therein.

One of methods for verifying the display ready states of the respective displays for the image signal of the new image source is verifying the display ready states of the respective display, based on signals corresponding to the respective displays. The signals corresponding to the respective displays may be signals inputted into or outputted from the respective displays. Verifying whether the respective displays are in the display ready states may be implemented using a logical operation algorithm for the signals corresponding to the respective displays. In particular, with respect to respective elements of each display, a logical operation algorithm for signals corresponding thereto may be used.

Figure 4:
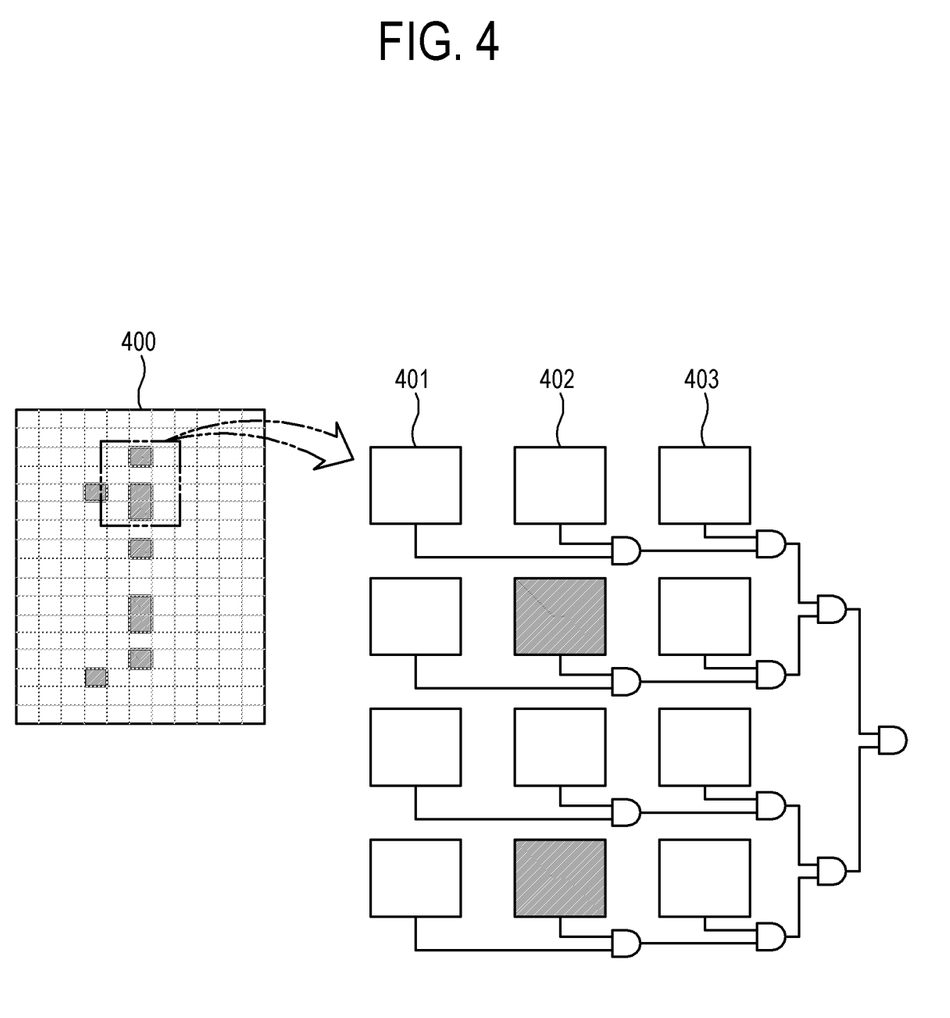
FIG. 4 is a view illustrating detailed constructions of a display ready state verifying unit according to an exemplary embodiment.

FIG. 4 illustrates detailed constructions of the display ready state verifying unit 208 according to an exemplary embodiment. Assuming that the respective displays of the display apparatus 400 are individual display elements 401, 402 and 403, circuits are connected to every display element to detect signals corresponding to the respective display elements. As illustrated in FIG. 4, if circuits for adjacent display elements are connected by AND gates, it may be determined whether all of display elements constituting the display apparatus has satisfied a specific condition, i.e., whether the respective displays are in the display ready states.

The specific condition may relate to specific signals outputted from or inputted into the respective display elements, but is not limited thereto. As examples of the specific signals outputted from the respective display elements, there may be an indicating signal to indicate whether a display element becomes a state where it receives an image signal, so that it can output the received image signal, a signal indicating whether an image signal inputted into a display element is a normal signal, and so on. As examples of the specific signals inputted into the respective display elements, there may be an image signal processed with respect to a new image signal, and so on.

For example, as illustrated in FIG. 4, if circuits connected to every display element 401, 402, 403 and the like are connected to portions from which indicating signals, i.e., signals indicating whether a corresponding display element becomes a state where it receives an image signals and output the received image signals, are outputted, respectively, it may be verified whether the respective display elements are in the states where they can output the received image signals, respectively, by an output value of a final AND gate after connecting the circuits for adjacent display elements by AND gates.

Thereby, with a simple structure, the phenomenon that the screen of the display apparatus is turned on or displayed like getting spotted when one image source is changed to another may be prevented. However, the circuit constructions illustrated in FIG. 4 are given just for example, and the constructions of the display ready state verifying unit 208 are not limited thereto.

In determining whether the respective displays are in the display ready states based on the signals corresponding to the respective displays at the display ready state verifying unit 208, signals to verify may be detected at various locations. This will be described with reference to FIG. 5.

Figure 5:
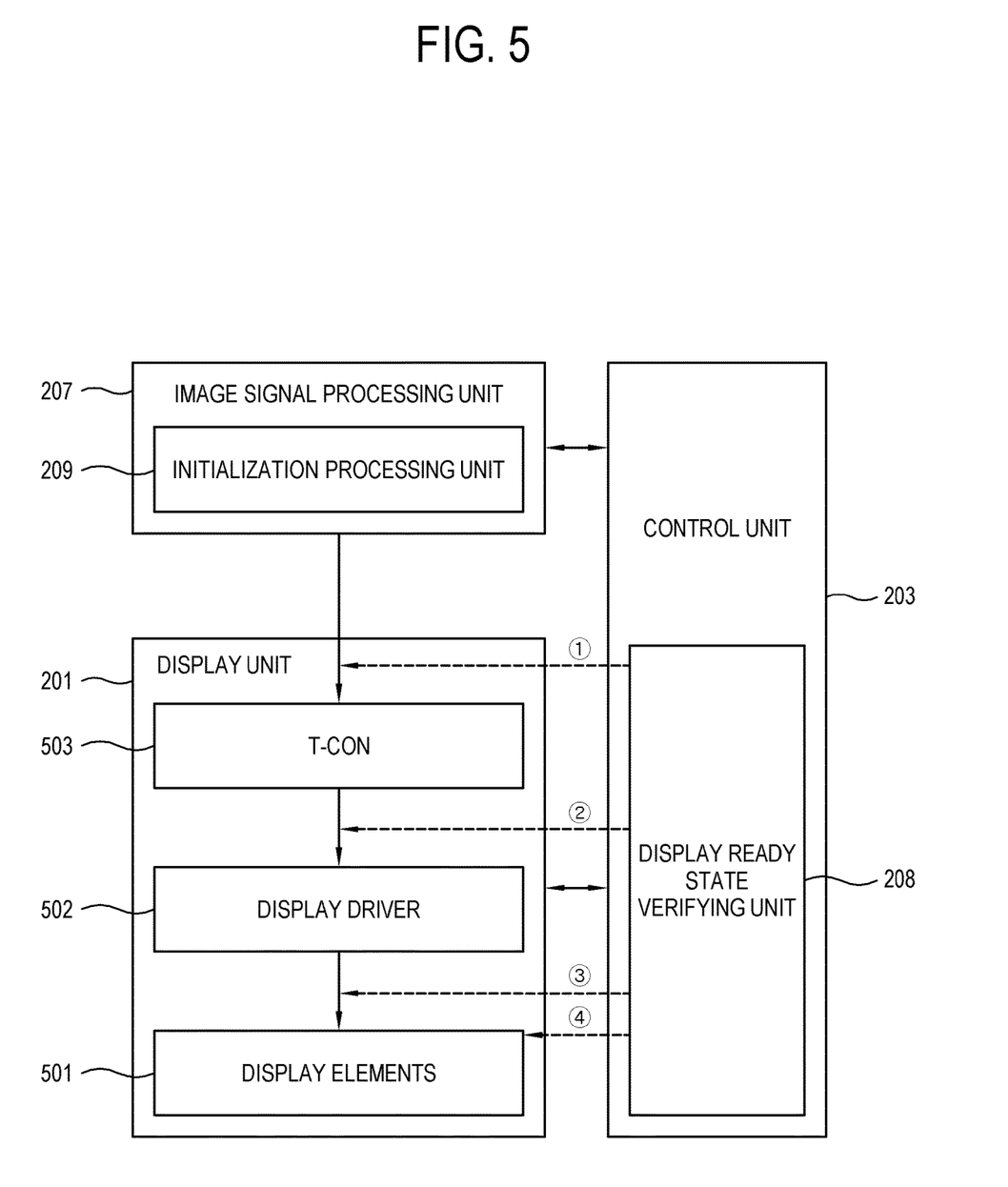
FIG. 5 is a block diagram illustrating detailed constructions of a display apparatus according to an exemplary embodiment.
Figure 6:
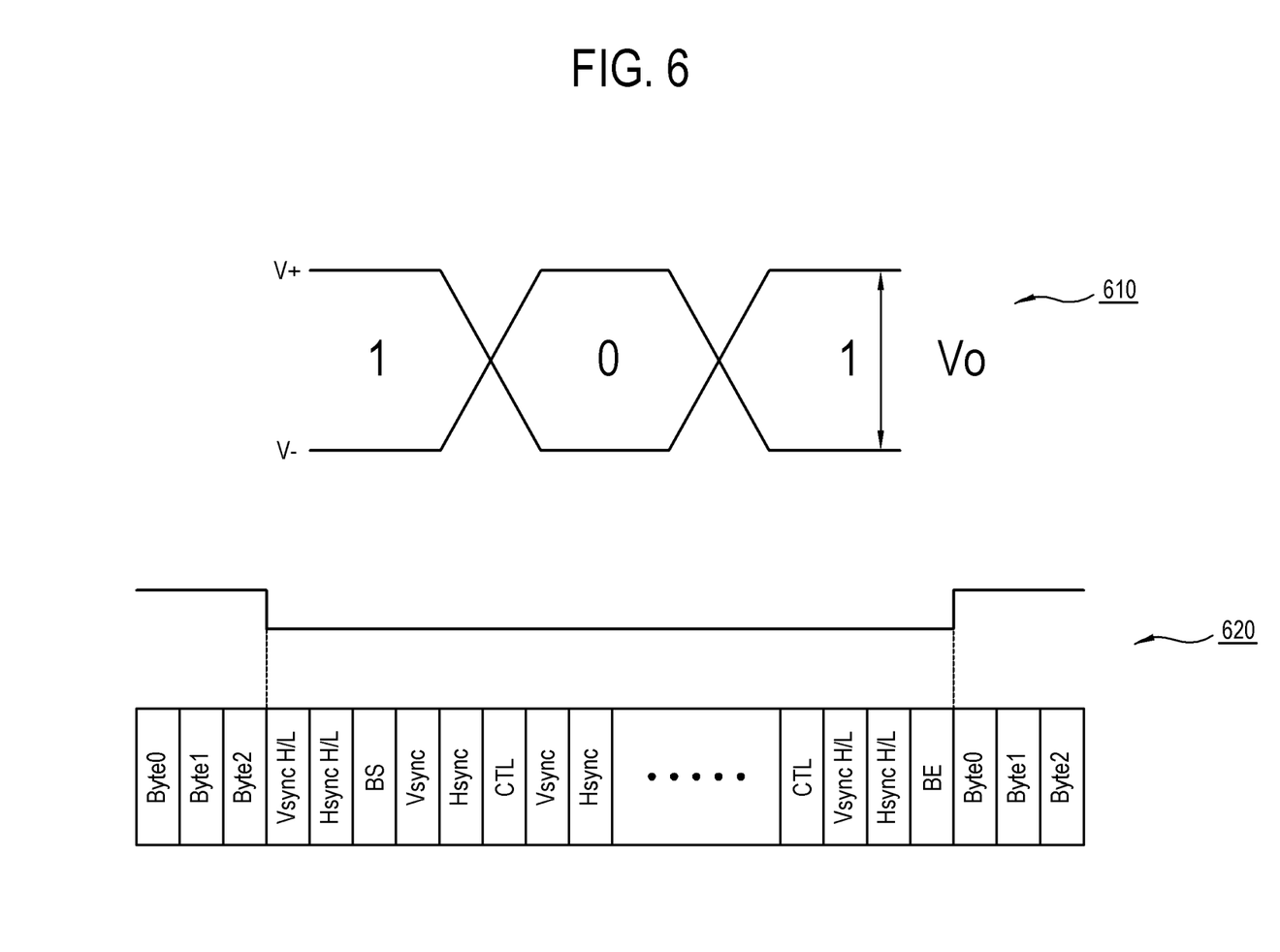
FIG. 6 is a view illustrating an example of a verifying target signal for the display ready state verifying unit according to an exemplary embodiment.

FIG. 5 is a block diagram illustrating detailed constructions of the display apparatus according to an exemplary embodiment. As compared with FIG. 3, a structure of the display unit 201 is illustrated in more detail. As illustrated in FIG. 5, the display unit 201 may include a plurality of displays (i.e., display elements) 501, a display driver 502 and a time controller (T-CON) 503.

The displays 501 mean respective detail units constituting the display unit 201, as described above. Image signals, which are processed via the image signal processing unit 207, finally arrive at the respective displays 501.

The display driver 502 is used to drive the respective displays 501 constituting the display unit 201. For example, if the display apparatus is a liquid crystal display (LCD) type, data of respective pixels inputted in digital form are changed into analog data and transmitted to a LCD panel line by line.

The T-CON 503 provides to the display driver 502, a control signal needed for driving the display driver 502. Further, the T-CON 503 acts to improve image quality and adjust an amount of data transmitted to the display driver 502. Also, the T-CON 503 acts to adjust times when signals are transmitted to the displays 501, in a lump.

The display apparatus according to an exemplary embodiment may select specific signals from among signals communicated between the image signal processing unit 207 and the displays 501. Then, it may be verified whether the respective displays are in the display ready states, based on the selected signals. For example, as illustrated in FIG. 5, the display ready state verifying unit 208 may determine whether the respective displays are in the display ready states based on signals transmitted to the T-CON 503 from the image signal processing unit 207 (①), signals transmitted to the display driver 502 from the T-CON 503 (②), signals transmitted to the individual display elements 501 from the display driver 502 (③), or signals outputted from the individual display elements 501 (④). However, signals of other locations may be used to determine whether the respective displays are in the display ready states according to another exemplary embodiment.

In verifying the display ready states of the respective displays by the display ready state verifying unit 208, types or contents of the signals, each of which is subject to verification, may vary widely. Accordingly, the control unit 203 or the display ready state verifying unit 208 of the display apparatus according to an exemplary embodiment may verify the display ready states of the respective displays based on characteristics of the image signal processed with respect to the new image source. Examples of the characteristic of the processed image signal may include, but are not limited to, whether the image signal is an analog signal or a digital signal.

If the image signal is an analog signal, the display ready state verifying unit 208 may determine whether the reception of the image signal is completed based on electric characteristics of the corresponding signal. For example, the display ready state verifying unit 208 may verify the display ready states of the respective displays according to whether image signals processed with respect to the new image source transmitted to the respective displays are equal to or greater than a predetermined level. As an example, if the image signal transmission interface in the display apparatus uses a Low-Voltage Differential Signaling (LVDS), in which a LVDS signal transmits information by a voltage difference Vo between two inputted signals as illustrated in view 610 of FIG. 6, a signal may be determined as an effective signal if the voltage difference is equal to or greater than a predetermined value. According to the LDVS standard, since a minimum voltage difference between two inputted signals is defined as 100 mV, the display ready state verifying unit 208 may verify the reception/non-reception of the image signal using that value. However, since such a voltage difference may vary according to the receiving unit for the LVDS signal, the voltage difference is not limited to 100 mV.

If the image signal is the digital signal, the display ready state verifying unit 208 may verify the display ready states of the respective displays based on data characteristics of the corresponding signals. For example, the display ready state verifying unit 208 may verify the display ready states of the respective displays according to packet information of the image signal processed with respect to the new image source and transmitted to the respective displays. As an example, if the image signal transmission interface in the display apparatus is a H-by-One HS, an image signal is transmitted in the form of packet having a structure as illustrated in view 620 of FIG. 6. Accordingly, the display ready state verifying unit 208 may verify the display ready states of the respective displays using such structures and forms of the packet. However, since concrete structures of packet may vary according to the interfaces, packet information is not limited to that as illustrated in view 620 of FIG. 6.

By verifying the display ready states of the respective displays based on the characteristics of the image signal, the display apparatus may quickly and precisely determine the display ready states of the respective displays.

On the other hand, in the display apparatus according to an exemplary embodiment, each of the displays constituting the display unit 201 of the display apparatus may be one display module. Even in this case, the constructions and operations of the display apparatus according to the previous exemplary embodiments in which each of the displays constituting the display unit 201 of the display apparatus is an individual display element may also be applied. Such case will be described with reference to FIG. 7.

Figure 7:
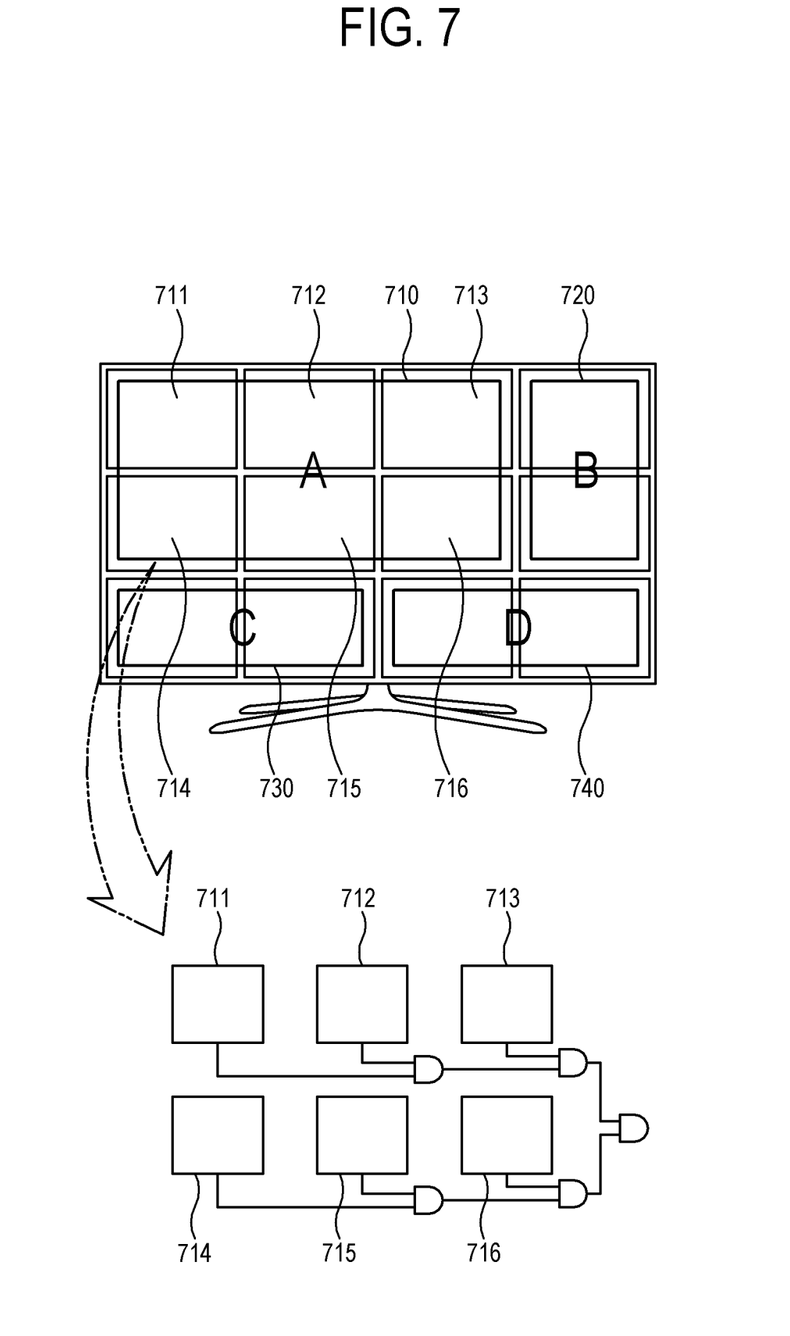
FIG. 7 is a view illustrating detailed constructions of a display ready state verifying unit according to another exemplary embodiment.

FIG. 7 is a view illustrating a display ready state verifying unit 208 according to another exemplary embodiment.

Similar to view 180 of FIG. 1, the entire multi display may be divided into A, B, C, and D areas 710, 720, 730 and 740, so that an image source is distributed to the A, B, C, and D areas 710, 720, 730 and 740. In the A area 710, the image source is again distributed to display modules 711 to 716. Accordingly, by matching the display modules 711 to 716 with the display elements in the previous exemplary embodiments, respectively, the constructions and operations according to the previous exemplary embodiments may be applied to the present exemplary embodiment. For example, similar to verifying the display ready states of the respective displays by connecting the circuits to the respective display elements and connecting the circuits by the AND gates as described above with reference to FIG. 4, display ready states of the respective display modules even in FIG. 7 may be verified by connecting circuits to the respective display elements 711 to 716 and connecting the circuits by AND gates. The display ready state of each display module may be verified by information on corresponding display module, and/or information on respective display elements constituting the corresponding display module.

The former may be achieved by verifying that an image signal bas been received by the corresponding display module, verifying that the corresponding display module is in a state where the display module can output the received image signal, or the like. The latter may be achieved by verifying that all the display elements constituting the corresponding display module are in states where the display elements can output image signals after receiving the image signals, or the like. Moreover, the display unit is the multi type display, but like the single type display, may be also configured to verify display ready sates of the respective individual display elements.

As described above, the present disclosure may be applied to the multi display apparatus composed of the plurality of display modules, as well as the display apparatus having a single display module.

Also, the present disclosure may be applied only to displays in some area from among a plurality of displays constituting the display unit 201. For example, if the display apparatus is configured as illustrated in FIG. 7, the present disclosure may be applied only to displays in the A area 710 among the A, B, C, and D areas 710, 720, 730 and 740. The same image signal may be transmitted to the A, B, C, and D areas 710, 720, 730 and 740 so that one image signal is distributed to the A, B, C, and D areas 710, 720, 730 and 740. Alternatively, separate image signals may be respectively transmitted to the A, B, C, and D areas 710, 720, 730 and 740 so that the A, B, C, and D areas 710, 720, 730 and 740 output separate screens, respectively. Applying the present disclosure only to the displays in some area may be particularly useful to the latter case.

Figure 8:
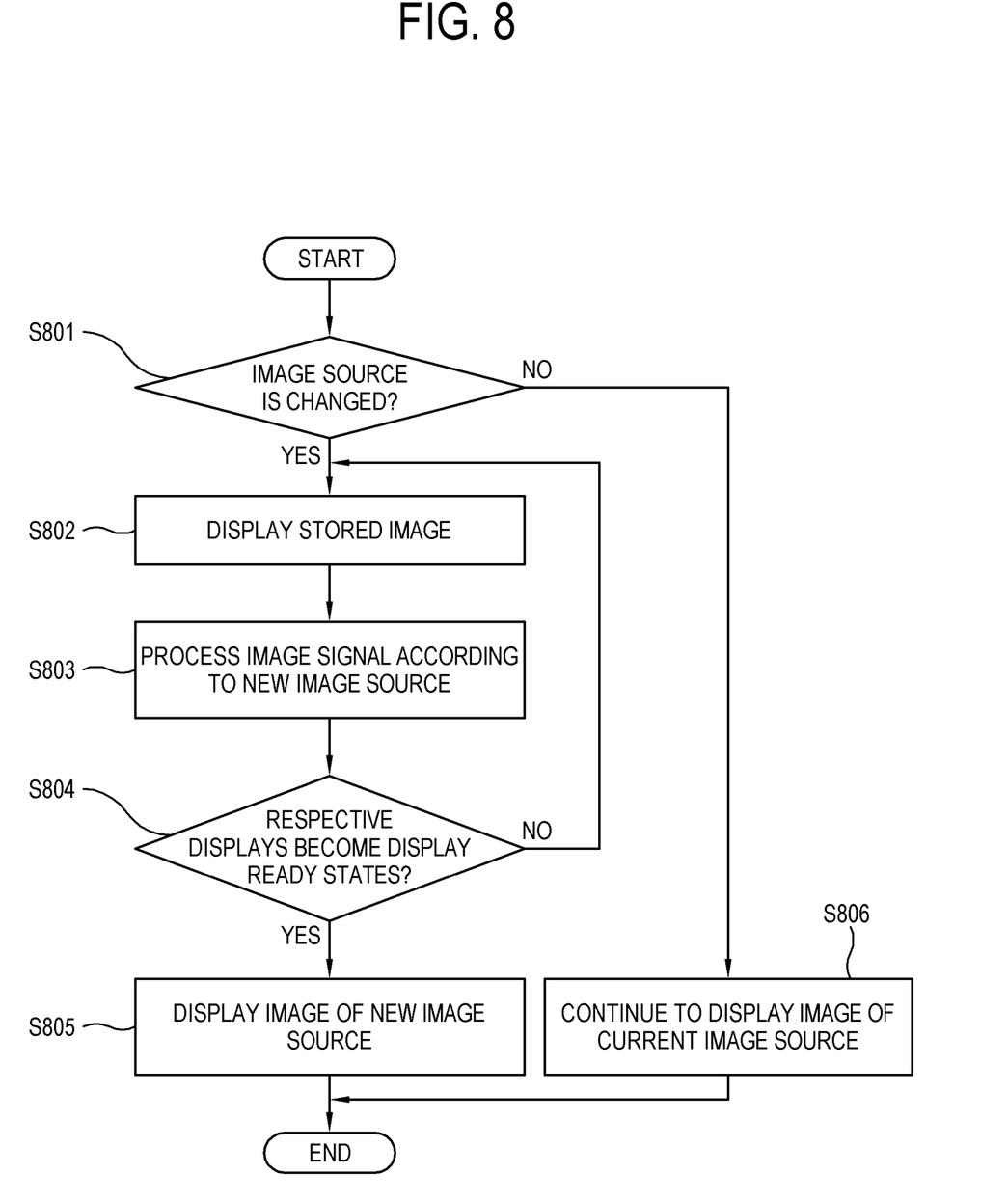
FIG. 8 is a flowchart illustrating a control method of the display apparatus according to an exemplary embodiment.

FIG. 8 is a flowchart illustrating a control method of the display apparatus according to an exemplary embodiment. The display apparatus according to an exemplary embodiment may detect whether an image source is changed (S801). This operation may be replaced by receiving an image source changing command from a user.

If the image source is not changed or there is no image source changing command from the user, the display apparatus may continue to display an image of the current image source (S806).

If the change of the image source is detected or the image source changing command is received from the user, the display apparatus may store the currently displayed image in the storing unit 210 and display the stored image (S802). Here, it is assumed that an option for displaying the existing image before an image of the newly changed image source is displayed, is selected.

At the same time, the display apparatus processes an image signal according to the newly changed image source (S803).

Meanwhile, the display apparatus determines whether respective displays become display ready states (S804). In other words, the display apparatus determines whether the displays are ready to process an image signal received from the newly changed image source.

If it is determined that the respective displays are not in the display ready states, the display apparatus may continue to display the stored image and processes the image signal according to the newly changed image source (S802 and S803). If it is determined that the respective displays are in the display ready states, the display apparatus may display the image of the newly changed image source (S805).

As described above, according to the exemplary embodiments, the display apparatus may prevent the phenomenon that the screen is turned or displayed like getting spotted when an image source is changed.

While the exemplary embodiments have been shown and described with reference to various embodiments thereof, it will be understood by those skilled in the art that various changes in form and details may be made therein from the foregoing description. For example, even if technologies disclosed herein are carried out in different orders from methods described herein, or elements disclosed herein, such as systems, structures, apparatuses, circuits and the like are combined or connected in different forms from methods described herein or replaced or displaced by different elements from elements described herein or their equivalents, proper results may be achieved. Accordingly, it should be understood that the present disclosure is not limited to the foregoing exemplary embodiments and the accompanying drawings, and that different implementations, different exemplary embodiments and equivalents of the appended claims are considered to be within the scope of this invention as defined by the appended claims, and the methods disclosed herein are to be considered in all respects as illustrative and not restrictive.

What is claimed is:

1. A display apparatus comprising:
a display unit comprising a plurality of displays, the plurality of displays comprising light emitting diodes (LEDs);
an image signal receiver configured to receive an image signal from one among a plurality of image sources;
a storing unit; and
a controller configured to:
display a first image on the display unit based on an image signal which is received from a first image source,
in response to detecting that an image source is changed from the first image source to a second image source while the first image of the first image source is being displayed on the display unit, store, in the storing unit, data of the first image which is displayed on the display unit,
display a second image on the display unit based on the data of the first image stored in the storing unit,
while maintaining a display of the second image based on the stored data, identify whether the displays are ready to display a third image by driving the LEDs based on an image signal of the second image source, and
display the third image corresponding to the image signal of the second image source on the display unit based on a result of the identifying.

2. The display apparatus according to claim 1, wherein the controller is further configured to identify whether the displays are ready to display the third image based on signals inputted to or outputted from the displays.

3. The display apparatus according to claim 1,
wherein each of the plurality of displays comprises a display element, and
wherein the controller is further configured to identify whether a plurality of display elements corresponding to the displays are ready to display the third image.

4. The display apparatus according to claim 3, wherein the controller is further configured to identify whether the plurality of display elements are ready to display the third image based on characteristics of signals inputted to or outputted from the displays.

5. The display apparatus according to claim 4, wherein the controller is further configured to identify whether the plurality of display elements are ready to display the third image based on whether the signals have a level equal to or greater than a predetermined level.

6. The display apparatus according to claim 3, wherein the controller is further configured to identify whether the plurality of display elements are ready to display the third image based on packet information of signals inputted to or outputted from the displays.

7. The display apparatus according to claim 1, wherein the controller is further configured to identify whether the displays are ready to display the third image using a plurality of logic AND gates connected to the displays.

8. The display apparatus according to claim 1, wherein each of the plurality of displays is a display module.

9. The display apparatus according to claim 1, further comprising:
a display driver configured to drive the displays; and
a timing controller configured to provide a control signal for the display driver,
wherein the controller is further configured to identify whether the plurality of displays are ready to display the third image based on signals inputted to one of the display driver, the timing controller and the displays.

10. A method for controlling a display apparatus comprising a plurality of displays comprising light emitting diodes (LEDs), the method comprising:
displaying a first image based on an image signal received from a first image source;

in response to detecting that an image source is changed from the first image source to a second image source while the first image is being displayed, storing data of the first image in a storing unit, displaying a second image based on the data of the first image stored in the storing unit, while maintaining a display of the second image based on the stored data, identifying whether the displays are ready to display a third image by driving the LEDs based on an image signal of the second image source; and display the third image corresponding to the image signal of the second image source on the display apparatus based on a result of the identifying.

11. The method according to claim 10, wherein the identifying comprises identifying whether the displays are ready to display the third image based on signals inputted to or outputted from the displays.

12. The method according to claim 10,
wherein each of the plurality of displays comprises a display element, and
wherein the identifying comprises identifying whether a plurality of display elements corresponding to the displays are ready to display the third image.

13. The method according to claim 12, wherein the identifying comprises identifying whether the plurality of display elements are ready to display the third image based on characteristics of signals inputted to or outputted from the displays.

14. The method according to claim 13, wherein the identifying comprises identifying whether the plurality of display elements are ready to display the third image based on whether the signals corresponding to the respective displays have a level equal to or greater than a predetermined level.

15. The method according to claim 12, wherein the identifying comprises identifying whether the plurality of display elements are ready to display the third image based on packet information of signals inputted to or outputted from the displays.

16. The method according to claim 10, wherein the identifying comprises identifying whether the displays are ready to display the third image using a plurality of logic AND gates connected to the displays.

17. The method according to claim 10, wherein each of the plurality of displays is a display module.

18. The method according to claim 10,
wherein the display apparatus further comprises a display driver configured to drive the displays and a timing controller configured to provide a control signal for the display driver, and
wherein the identifying comprises identifying whether the plurality of displays are ready to display the third image based on signals inputted to one of the display driver, the timing controller and the displays.

* * * * *